(12) United States Patent
Rolland

(10) Patent No.: US 6,766,729 B2
(45) Date of Patent: Jul. 27, 2004

(54) INFUSION MACHINE

(75) Inventor: Jacky Rolland, Saint Martin de Fontenay (FR)

(73) Assignee: SEB S.A., Ecully Cedex (FR)

( * ) Notice: Subject to any disclaimer, the term of this patent is extended or adjusted under 35 U.S.C. 154(b) by 8 days.

(21) Appl. No.: 10/239,832

(22) PCT Filed: Mar. 26, 2001

(86) PCT No.: PCT/FR01/00901

§ 371 (c)(1),
(2), (4) Date: Sep. 26, 2002

(87) PCT Pub. No.: WO01/72190

PCT Pub. Date: Oct. 4, 2001

(65) Prior Publication Data

US 2003/0029322 A1 Feb. 13, 2003

(30) Foreign Application Priority Data

Mar. 27, 2000 (FR) .............................................. 00 03868

(51) Int. Cl.⁷ ................................................ A47J 37/00
(52) U.S. Cl. .............................. 99/284; 99/279; 99/306
(58) Field of Search ......................... 99/284, 279, 307, 99/306, 304, 305

(56) References Cited

FOREIGN PATENT DOCUMENTS

| DE | 79 15 161 | 8/1979 |
| DE | 39 03 003 | 8/1990 |
| DE | 91 09 023.7 | 9/1992 |
| EP | 0549887 | * 11/1992 |
| EP | 0 585 607 | 3/1994 |

* cited by examiner

Primary Examiner—Reginald L. Alexander
(74) Attorney, Agent, or Firm—Young & Thompson

(57) ABSTRACT

An infusion machine includes a base receiving a collecting tray formed with a bottom and a side wall and provided with a cover forming a support for an infusion receptacle, as well as a device for producing infusion having a head for an infusion outlet, overlying the support by a distance. The support is movably mounted as to height relative to the tray by an adjustment device to cause the distance to vary. The adjustment device includes nesting members adjustable in height by sliding and distributed over at least two opposite regions of the sidewall of the well and of the periphery of the support.

6 Claims, 3 Drawing Sheets

INFUSION MACHINE

FIELD OF THE INVENTION

The present invention relates to infusion machines comprising a base receiving a collecting tray formed with a bottom and a sidewall and provided with a cover forming a support for an infusion receptacle, as well as an upright secured to the base and containing a device for making infusion, having an infusion outlet head overlying said support by a distance (d).

The invention relates more precisely to infusion machines of this type in which the support is movably mounted as to height relative to said tray by adjustment means to cause the distance (d) to vary.

BACKGROUND OF THE INVENTION

An adjustable support has already been described for example in the document EP0 585 607. The adjustment means disclosed in this document requires the combination of a screw drive and a device for locking in several positions. Such an arrangement is difficult to make and gives rise to increased cost of production. Moreover, this adjustment means works in the internal space of the tray receiving the infusion residues and is thus subject to soiling which can impede its operation.

SUMMARY OF THE INVENTION

The invention has particularly for its object to provide an adjustment means of the support on the tray which remains low cost and which at the same will have great ease of operation.

According to the invention, the adjustment means comprises nesting members adjustable as to height by sliding and distributed over at least two opposite regions of the sidewall of the tray and of the periphery of the support.

Thus, the height adjustment takes place in a simple and safe manner by simple sliding movement and is very clean because the nesting members are arranged outside the internal space of the tray.

In a preferred embodiment, the nesting means comprise, on the one hand, a set of opposite and staged slide ways in parallel planes, and on the other hand, at least two ribs adapted to come into engagement respectively with two opposite slide ways.

This arrangement permits the user to adjust the support by simple horizontal movement in the manner of a drawer.

BRIEF DESCRIPTION OF THE DRAWINGS

The characteristics and advantages of the invention will become further apparent from the description which follows, given by way of non-limiting example, with reference to the accompanying drawings, in which.

DETAILED DESCRIPTION OF THE INVENTION

Figure 1:
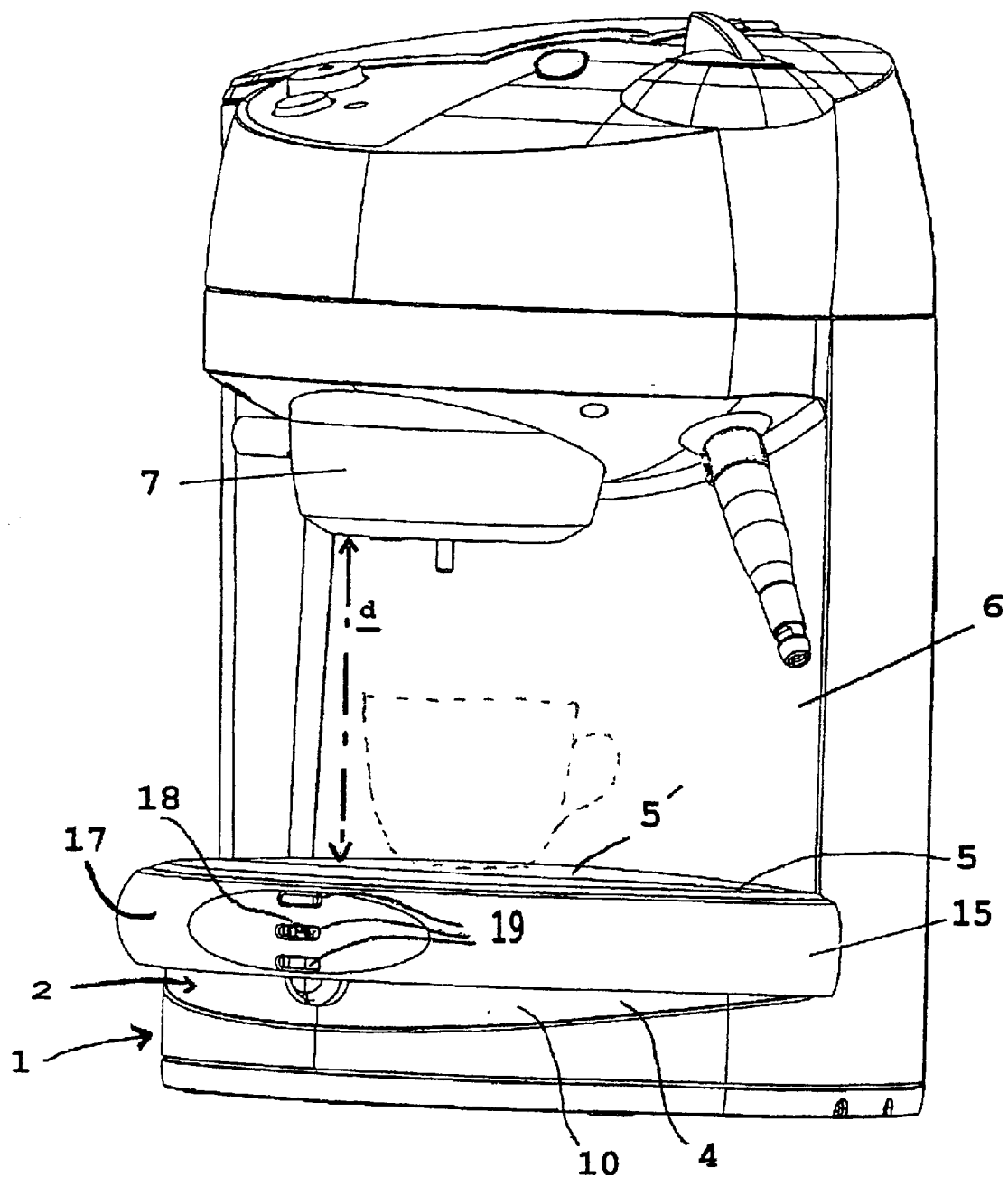
FIG. 1 is a fragmentary perspective view of an infusion machine showing a collector tray provided with a cover forming a support according to the invention.

The infusion machine shown in FIG. 1 comprises a base 1 receiving a collector tray 2 formed by a bottom 3 and a sidewall 4 constituted the periphery and provided with a cover 5 whose periphery caps the sidewall 4 and which forms a support for an infusion receptacle which can for example be a small or a large cup or else a pouring pot. This base is secured to an upright 6 in the form of a beam containing a device for producing infusion (not shown) and having an infusion outlet head 7 overlying the support 5 by a distance d.

The infusion machine can be of the espresso type or the drip type and its base can accept in an aesthetically appealing way different forms of tray. In the illustrated example, the tray 2 is removably mounted on the base 1 and has a semicylindrical shape whose sidewall 4 is formed by a rear substantially rectilinear section 8 matching the shape of the front surface 9 of the upright 6 and a front section 10 in the arc of a circle. The support 5 has an upper surface 5' having a shape of a semicircle.

In a manner known per se, the support 5 is movably mounted as to height relative to the tray 2 by adjustment means, designated overall by the reference numeral 11, to vary the distance d so as to permit correctly receiving the infusion either in a cup or in a pouring pot or any other receptacle of any height less than d disposed on the upper surface 5' of the support 5.

According to the invention, the adjustment means 11 comprises nesting members 12–13 adjustable as to height by sliding and distributed over at least two opposite regions of the sidewall 4 of the tray 2 and of the periphery of the support 5. According to a preferred embodiment, the nesting members 12–13 comprise, on the one hand, a set of slide ways 13 opposite and staged in parallel planes, and on the other hand, at least two ribs 12 adapted to come into engagement respectively with two opposite slide ways located in a same plane. In an embodiment (not shown), the nesting members can be small columns carried by the support and slide ways provided on the periphery of the sidewall of the tray with height adjustment means such as snap-in means.

Figure 3:
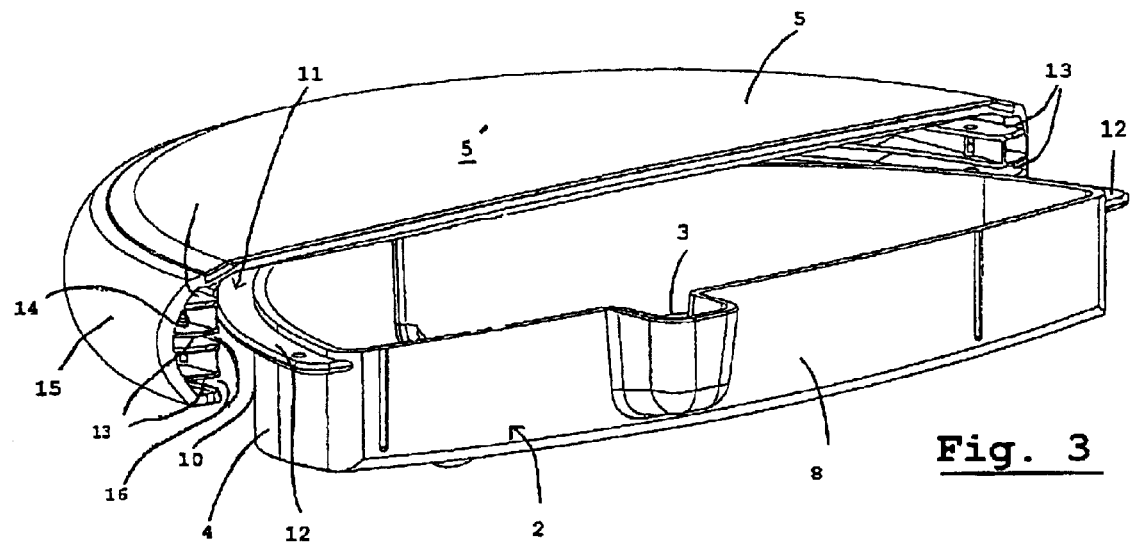
FIG. 3 shows in rear perspective a first phase of nesting of the cover on the tray.
Figure 4:
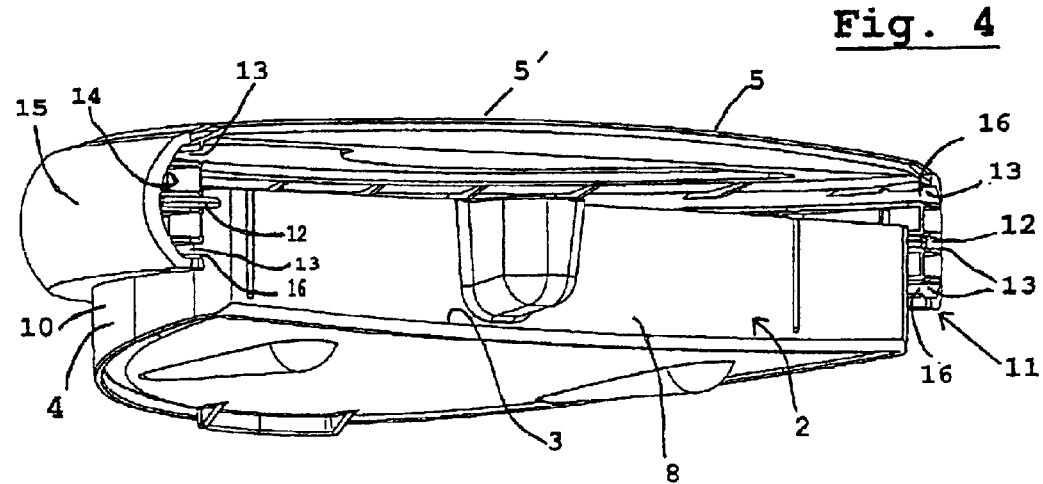
FIG. 4 shows in rear perspective the cover positioned on the tray at a selected level.

According to another characteristic of the invention and as shown in the drawings, the set of slide ways 13 is mounted on the internal wall 14 of a skirt 15 carried by the periphery of the support 5, and the ribs 12 are disposed on the external surface of the sidewall 4 of the tray 2. As is seen in FIGS. 3 and 4, the slide ways 13 are staged at three levels and the ribs 12 are arranged practically at the level of the upper edge of the tray 2. In this embodiment, the support 5 has a semicylindrical shape complementary to that of the tray and the ribs 12 as well as each slide way 13 being formed respectively from a single continuous piece extending over the respective curved surfaces on the front section 10 of the sidewall 4 of the tray and of the internal wall 14 of the skirt 15. The slide ways 13 are open at their ends 16.

Preferably, the sidewall 4 of the tray and the external wall 17 of the skirt 15 comprise indexing means for positioning as to height of the support 5 relative to the tray 2. These indexing means comprise a lug 18 projecting from the medial region of the front section 10 and a series of staged openings 19 also provided in the medial region of the skirt 15. In the present case, the openings 19 are three in number.

Thus, thanks to the invention, it will be understood that if the user desires to obtain a medium cup of coffee, he grasps the tray 2 and the support 5 and brings them into a first phase of nesting shown in FIG. 3. This first phase consists in selecting an adequate height of the support 5 relative to the tray 3, which operation is facilitated by bringing into coincidence the lug 18 and a selected one of the openings 19.

Figure 2:
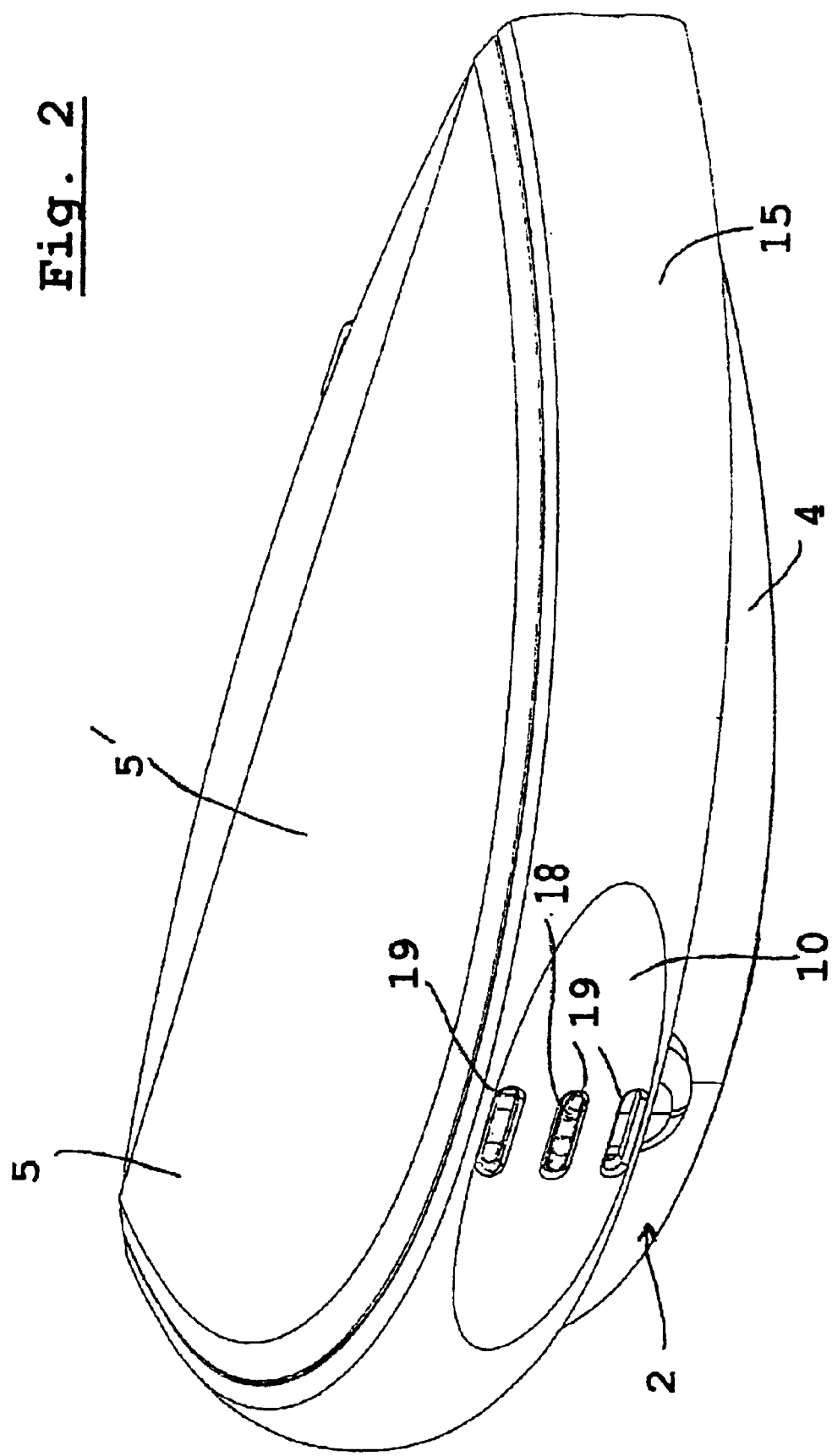
FIG. 2 shows on a larger scale and in front perspective the tray provided with its cover.

Then he carries out, by a movement of translation, a sliding of the support 5 relative to the tray 2 so as to bring the selected slide way into engagement with the rib 12 until reaching the corresponding position of FIGS. 1, 2 or 4, in this case a second level in which the upper surface 5' of the cover-support 5 is adapted to support a medium cup. The final position of nesting of FIGS. 1, 2 or 4 is a stable position guaranteed by the respective support surfaces of the rib 12 and of the slide way 13.

Thus, the operation of height adjustment takes place in a particularly simple and clean manner. Moreover, the cleaning of the tray is greatly facilitated because of the absence of any piece in its internal volume. Moreover, the adjustment means are also of simple production and hence economical, as they can be made by molding of the same piece both for the skirt provided with slide ways and for the tray with its rib.

What is claimed is:

1. Infusion machine comprising:

a base receiving a collecting tray formed with a bottom and a sidewall and provided with a cover forming a support for an infusion receptacle;

an upright secured to the base and containing a device for making infusion, having an infusion outlet head overlying said support by a distance;

said support being movably mounted as to height relative to said tray by adjustment means for varying the distance;

said adjustment means comprising nesting members adjustable as to height by sliding;

said nesting members comprising a set of opposite slideways staged at several levels in parallel planes, and implanted on an internal wall of a skirt carried by the periphery of the support, and at least two ribs implanted on an external surface on the sidewall of the tray, and adapted to come into respective engagement with two opposite slideways.

2. The infusion machine according to claim 1, wherein the slideways are staged at three levels, and the ribs are arranged practically at the level of the upper edge of the tray.

3. The infusion machine according to claim 2, wherein the tray and the support each have a semicylindrical shape, and the ribs as well as each slideway are formed respectively of a single continuous piece extending over the respective curved surfaces of the sidewall of the tray and of the internal wall of the skirt.

4. The infusion machine according to claim 1, where in the tray and the support each have a semicylindrical shape, and the ribs as well as each slideway are formed respectively of a single continuous piece extending over the respective curved surfaces of the sidewall of the tray and of the internal wall of the skirt.

5. The infusion machine according to claim 1, wherein the sidewall of the tray and the external wall of the skirt comprise indexing means for the height-wise positioning of the support relative to the tray.

6. The infusion machine according to claim 5, wherein the indexing means comprise a lug projecting from a medial region of a front section of the sidewall, and a series of staged openings provided in a medial region of the skirt.

* * * * *